Patented Aug. 15, 1939

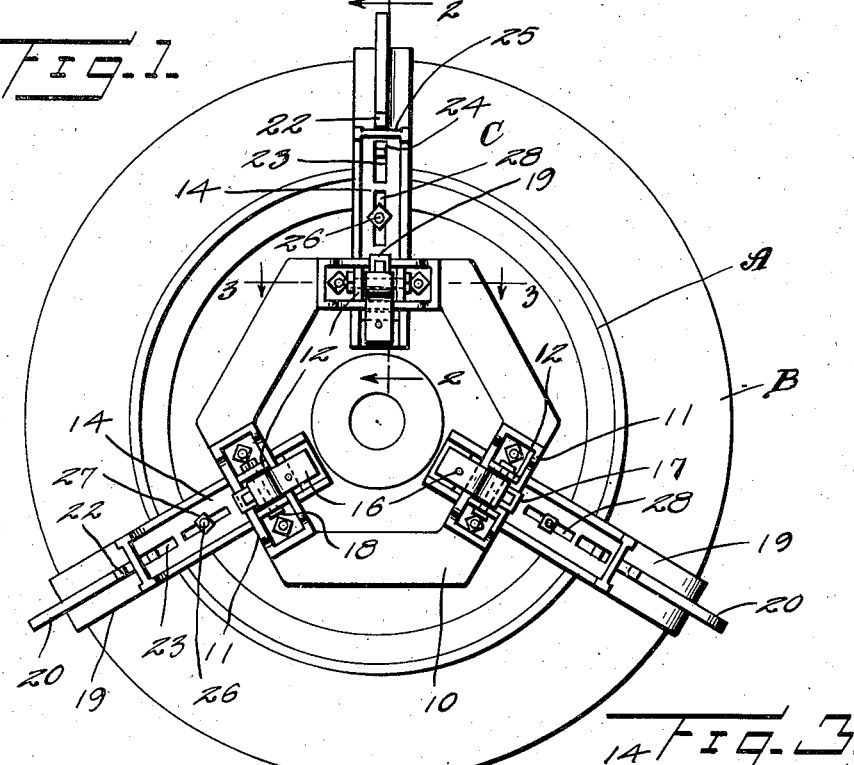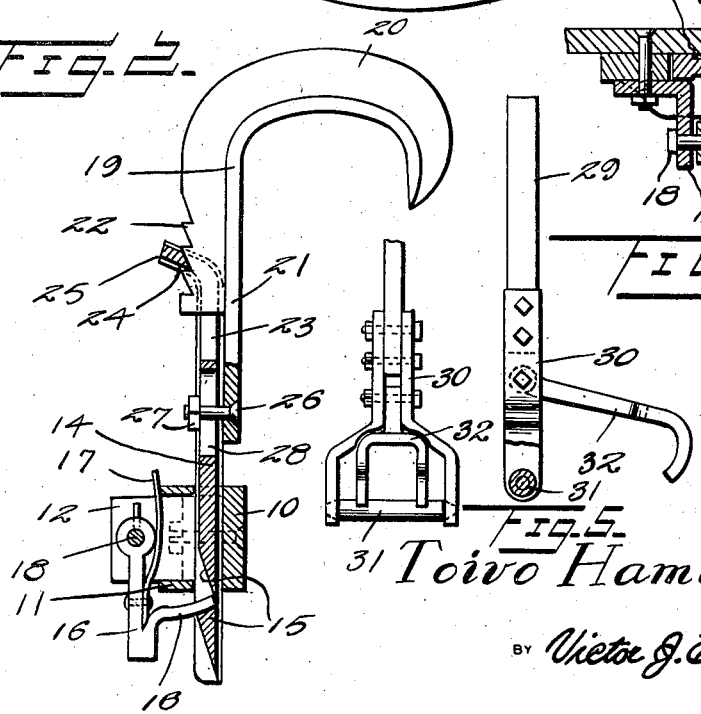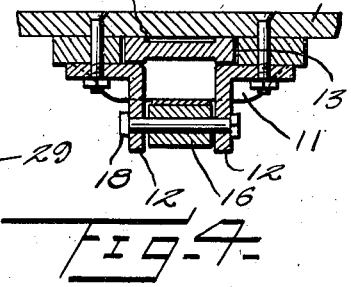

2,169,950

UNITED STATES PATENT OFFICE 2,169,950

ANTISKID DEVICE FOR VEHICLE WHEELS

Toivo Hamalainen, Finlayson, Minn.

Application October 24, 1938, Serial No. 236,746

1 Claim. (Cl. 152—228)

The invention relates to an antiskid device for vehicle wheels and more especially to a mud or snow hook for use on vehicle wheels.

The primary object of the invention is the provision of a device of this character, wherein a plurality of hooks can be engaged at different points over the tread of a pneumatic tire on the vehicle wheel so that should the wheel tire lose traction the hooks will grab to avoid such traction loss particularly when a vehicle is traveling upon a muddy surface or in snow.

Another object of the invention is the provision of a device of this character, wherein the plurality of hooks are assembled for adjustment so that the same can be applied to tired vehicle wheels of different sizes and when worn thereon will enable the wheel tire to have a firm tread for avoiding sticking in snow or mud, the device being of novel construction and may be conveniently adjusted for the mounting or fastening of the same upon a tired wheel or the like.

A further object of the invention is the provision of a device of this character, wherein the same, when mounted upon a tired wheel, will be secure to avoid accidental removal thereof and will enable firm or positive traction of the tired wheel, particularly when traveling over a slippery surface.

A further object of the invention is the provision of a device of this character, which is simple in its construction, thoroughly reliable and efficient in operation, susceptible of convenient mounting on and removal from a tired vehicle wheel, and in the wearing thereof will assure positive traction of such wheel on slippery surfaces, eliminating the necessity of jacking the wheel or otherwise raising the same for the application of the device, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a tired wheel showing the device constructed in accordance with the invention applied thereto.

Figure 2 is an enlarged fragmentary sectional view taken on the line 2—2 of Figure 1 looking in the direction of the arrows.

Figure 3 is a sectional view taken on the line 3—3 of Figure 1 looking in the direction of the arrows.

Figure 4 is a side elevation of a tool for service in the mounting of the device.

Figure 5 is a fragmentary plan view of such tool.

Similar reference characters indicate corresponding parts throughout the several views in the drawing.

Referring to the drawing in detail, A designates generally the wheel proper, being of standard construction, and B the tire worn thereby, which is of conventional pneumatic type, while C denotes generally the device constituting the present invention and hereinafter fully described.

The device C comprises a substantially hexagonal shaped frame 10, preferably flat faced at opposite sides thereof, and at the outer flat side of such frame, preferably at three points thereof are guides 11, being uniformly spaced from each other at the three-point locations thereof, and each has associated therewith spaced outwardly directed pivot ears 12 while within such guides is a guideway 13 for a slide arm 14 having built therein at the outer side inset rack teeth 15 selectively engageable by a spring-pressed latching dog or ratchet latch 16, its spring being indicated at 17, for urging the dog or latch 16 into engagement with a rack tooth 15 and in this manner the arm 14 is latched or held fast against sliding movement in one direction, the dog or latch 16 being swingable on a pivot 18 mounted in the pivot ears 12 and such dog or latch is located between these spaced ears 12. The dog or latch 16 is manually releasable for the freeing of the arm 14 for sliding movement in its companion guide 11.

Adjustably fitted with each arm 14 is a hook 19 having a flange-like gripping rib or lug 20 for biting into mud or in snow covering a surface over which the vehicle wheel A travels and assures a firm tread to the tire B of said wheel A. The flange rib or lug 20 is partially longitudinally extended with a stem 21 of the hook 19 and this extended portion is formed with rack teeth 22. The extended rib or lug 20 with the teeth 22 passes through a clearance slot 23 provided in the arm 14 and coincident with the said slot 23 is a latching lip 24, being extended from an outwardly curled end 25 of the said arm 14 and such lip 24 selectively engages a tooth 22 so that the hook 19 with the stem 21 can be locked against relative movement to the arm 14. The stem 21 of the hook 19 is fitted with a bolt 26 carrying a nut 27 and such bolt movably fits within a slot 28 therefor provided in the arm 14. Now on the tightening of the bolt 26 by its nut 27, the stem 21 and such arm 14 will be fastened together and in this manner the said hook 19 is adjusted on the arm 14.

In this instance there are three hooks 19, these being located at three points circumferentially of the tire B of the vehicle wheel A and when the device is worn by the wheel, it will assure positive traction action to the wheel, the hooks being employed for fitting to the wheel to avoid traction loss when a wheel is traveling over a muddy surface or in snow.

By reason of the arrangement of the hooks 19, these being uniformly spaced from each other at the outer periphery of the tire B of the wheel A, assures against skidding when worn by the wheel.

In Figures 4 and 5 of the drawing there is shown a tool adaptable for use in adjusting the hooks 19 with relation to the frame 10 on the application of the device to a tired wheel and the clamping of such device thereon. The tool comprises a handle bar 29 made fast to a fork 30 having journaled transversely therein a roller 31 while pivoted adjacent to the fork 30 is a fulcruming hook 32 which is adapted to cooperate with the roller 31 on the applying of the tool so that adjustment of each hook 19 can be had. These hooks 19 in the series are drawn tightly against the tread of the tire B and such drawing being had by the use of the tool just described in that the stems 15 of said hooks will be slidably forced inwardly of the wheel A and the arms 14 rendered adjustable will become latched thus holding the hooks 19 securely engaged with the tire B of the wheel A for the wearing of the device thereon without accidental detachment.

Of course, it is understood that the tool hereinbefore described may be used for the releasing of a hook or hooks when it is desired to remove or detach the device from the wheel.

The device when worn upon the wheel will prevent skidding thereof and also the loss of traction at the tread of the tire B, particularly when traveling through mud or in snow.

What is claimed is:

A device of the character described comprising a central member, arms slidably fitted with and extending radially from said member, means for latching the arms in adjusted positions, tread-engaging hook members adjustably connected with said arms, guides carried by the said central member and having the arms slidably fitted therein, means associated with said guides for latching engagement with said arms, rack teeth formed in said arms and selectively engageable by said last-named means, teeth formed on the hook members, and lips on said arms for selectively engaging the teeth on the hook members.

TOIVO HAMALAINEN.